United States Patent [19]
Morin

[11] 3,831,400
[45] Aug. 27, 1974

[54] CONSTANT-VELOCITY JOINT
[75] Inventor: Gerard Morin, Bondy, France
[73] Assignee: Societe Anonyme D.B.A., Paris, France
[22] Filed: Apr. 9, 1973
[21] Appl. No.: 349,139

[30] Foreign Application Priority Data
Apr. 20, 1972 France .............................. 72.13906

[52] U.S. Cl. .............................. 64/21, 64/8, 64/9 A
[51] Int. Cl. .............................................. F16d 3/30
[58] Field of Search ............ 64/21, 8, 7, 9 A, 15 C

[56] References Cited
UNITED STATES PATENTS

| | | | |
|---|---|---|---|
| 1,677,311 | 7/1928 | Weiss | 64/9 A |
| 2,238,647 | 4/1941 | Ivandick | 64/21 |
| 2,441,052 | 5/1948 | Wilmer | 64/8 |
| 2,473,036 | 6/1949 | Miller, Jr. | 64/9 A |
| 2,923,141 | 2/1960 | Simonds | 64/21 |

Primary Examiner—Samuel Scott
Assistant Examiner—Randall Heald
Attorney, Agent, or Firm—Ken C. Decker; William N. Antonis

[57] ABSTRACT

A constant-velocity joint of the type having torque transmitting members in the form of two interlacing forks and bearing balls situated between the prongs of the fork, the balls being movable in grooves provided in the mutually opposite surfaces of the fork prongs. To prevent relative axial motion of the forks, a flexible tie has each of its ends connected to a respective fork in the central region of the joint. In a preferred embodiment, the tie is a spring steel wire coiled to have closely wound turns. When the joint is bent, the tie is curved in the region of its center with sufficient flexibility to prevent jamming of the joint. The flexible tie is more economical to manufacture than the prior art connecting means such as those including a ball and socket device whose center acurately coincides with the joint's bending center.

3 Claims, 1 Drawing Figure

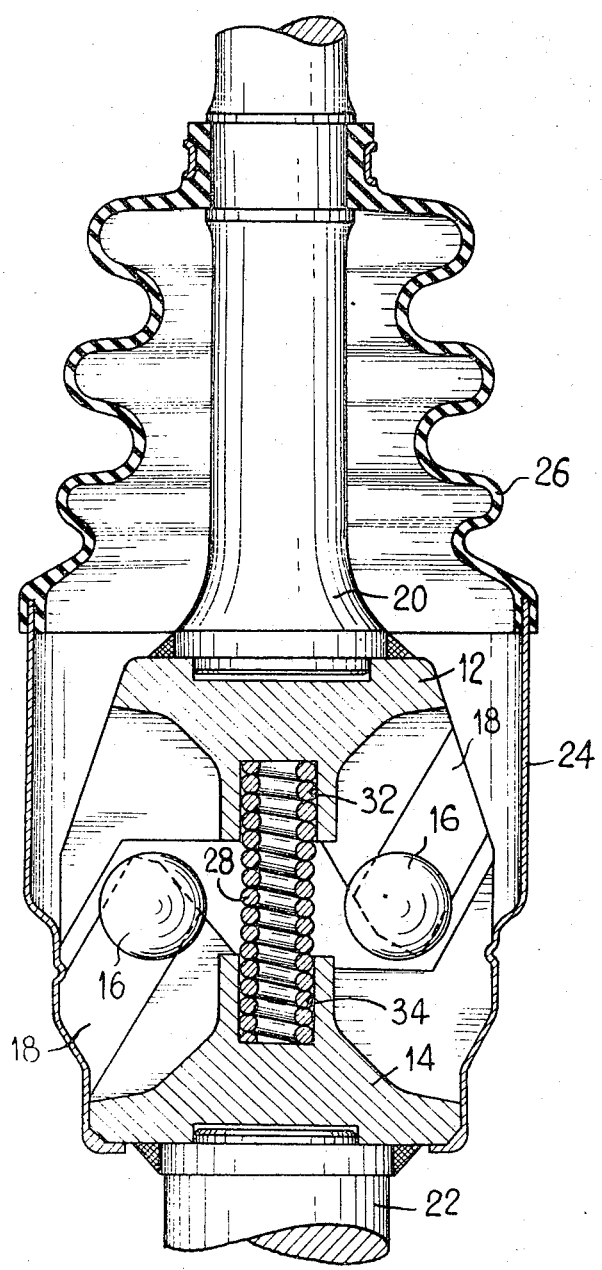

CONSTANT-VELOCITY JOINT

The invention relates to constant-velocity joints of the type having two interlacing forks and bearing balls, situated between the prongs of the forks, the balls being movable in grooves provided in the mutually opposite surfaces of the fork prongs.

Whatever the bending angle of a joint of this type, the centres of the balls are always situated in a single plane, the plane which bisects the bending angle and which therefore passes through the bending centre of the joint. The joint is therefore a constant-velocity joint, since any rotation of one fork about the joint axis produces identical rotary motion of the other fork.

In a known joint of this type all relative axial motion of the forks is prevented by interconnecting the forks by articulated locking means comprising an additional bearing ball or a ball joint whose centre coincides with the joint's bending centre. This arrangement has the disadvantage of requiring extremely accurate machining of the joint components, since, if the centre of the bearing ball or ball joint is offset relative to the joint's bending centre, the joint is liable to jam.

An important object of the invention is to provide a constant-velocity joint of the type defined, with a much simpler locking means.

In the joint according to the invention, the locking means comprises a flexible tie which is situated in the central region of the joint and of which each end is connected to a respective fork. In a preferred embodiment of the invention, the flexible tie is a spring steel wire coiled to form a helix having contiguous turns.

A tie of this kind is easy to manufacture without any accurate machining, and it efficiently prevents axial sliding of the forks of the joint. When the joint is bent, the tie is curved in the region of its centre, with sufficient flexibility to prevent seizing of the joint.

The invention will be now described by way of example with reference to the single accompanying FIGURE, which illustrates a constant-velocity joint embodying the invention, in section along a plane passing through the centre of two bearing balls.

The constant-velocity joint illustrated in the single FIGURE has two torque-transmitting elements 12, 14 in the form of two-pronged forks. The forks 12, 14, interlace, and four bearing balls 16 are movable along races 18 provided in the mutually opposite surfaces of the fork prongs. A driving shaft 20 and a driven shaft 22 are welded to the bases of the forks 12, 14 respectively. When the shafts 20, 22 are in alignment, their axis defines the axis of the joint. The joint is surrounded by a metal casing 24 of which one end is connected to the base of one (14) of the forks. The other end of the casing 24 is open and is connected to a flexible cover 26 in the form of a bellows attached to the shaft 20. The casing 24 and cover 26 define a fluid-tight enclosure which may contain a lubricant.

The joint is also provided with locking means for preventing the forks 12, 14 from sliding relative to one another in the axial direction.

As illustrated in the FIGURE, the locking means comprises a flexible, substantially inextensible cord or tie 28 of which each end is fixed to one of the forks 12, 14. In the embodiment illustrated in the FIGURE, the flexible cord 28 is formed of a spring steel wire coiled to form a helix having contiguous turns, and the ends of the cord are force-fitted into recesses 32, 34 formed in the mutually opposite surfaces of the forks 12, 14 respectively.

Assembly of the joint does not present any difficulty. It is merely necessary to insert the spring in one fork, to engage the spring in the other fork, to introduce the four bearing balls between the fork prongs, and finally to press-fit the cord in the recesses.

When the joint bends while in use, the cord 28 naturally curves in the region of its centre, in such a way that the apex of the curve assumed by the cord is approximately situated in the plane containing the four bearing balls 16. The cord is flexible enough for the apex of the curve to be brought at all times into coincidence with plane of the balls, so eliminating the risk of seizing attached to the known joints, which were liable to seize when the pivot of the articulated system connecting the forks was fixed and needed to coincide exactly with the joint's bending centre.

A universal joint embodying the invention is economical to construct, since the connection between the forks 12, 14 does not require accurate machining. If the cord 28 is formed by steel wire coiled into a helix having contiguous turns, the cord is of course substantially inextensible under the conditions in which it is used, since it is not normally subjected to any tensile or torsional stress. When it bends it undergoes slight elongation, but this can be absorbed by the play in the transmission system incorporating the joint. The cord 28 can therefore be made small enough not to interfere with bending of the joint.

Obviously, materials other than steel wire are suitable for the cord 28, which may, for example, be formed by a length of steel cable or by a rod or pin of composite material.

A joint embodying the invention may be used advantageously as a joint for a rear wheel or a low-lock front wheel in transmission systems situated between the differential and the driving wheels of a motor vehicle.

I claim:

1. A constant-velocity joint capable of bending relative to a bending center, comprising:
    a pair of torque transmitting members in the form of forks, each fork having prongs and a central region between said prongs, said forks being interlaced and said central regions facing each other;
    grooves formed on the mutually opposite surfaces of said prongs;
    balls movable in said grooves, the centers of said balls remaining, whatever the joint's bending angle, in a single plane, said single plane also containing said bending center; and
    a transversely flexible, substantially axially inextensible cord means interconnecting said forks to hold said joint together and to prevent axial separation of the forks while permitting the joint to bend, each end of said cord means being connected to the central region of a respective fork.

2. A joint as claimed in claim 1, wherein said flexible cord means is a spring wire coiled to form a helix having contiguous turns.

3. A joint as claimed in claim 1, wherein each of said central regions includes a recess, the ends of said flexible cord means being force-fitted into said recesses.

* * * * *